United States Patent [19]

Muller

[11] 4,150,809
[45] Apr. 24, 1979

[54] VALVE DEVICE FOR DRAINING LIQUIDS

[75] Inventor: Helmut Muller, Bochum, Fed. Rep. of Germany

[73] Assignee: Siegfried Kiefer, Fed. Rep. of Germany; a part interest

[21] Appl. No.: 787,866

[22] Filed: Apr. 15, 1977

[30] Foreign Application Priority Data

Apr. 15, 1976 [DE] Fed. Rep. of Germany ....... 2616803

[51] Int. Cl.² ............................................. F16L 37/28
[52] U.S. Cl. ............................ 251/149.4; 251/149.6; 251/144; 137/351
[58] Field of Search ................. 251/144, 149.4, 149.6, 251/321, 322, 323, 339, 149.5, 149.7; 137/541, 351; 184/1.5

[56] References Cited

U.S. PATENT DOCUMENTS

| | | | |
|---|---|---|---|
| 130,835 | 8/1872 | Bailey | 137/541 X |
| 308,479 | 11/1884 | Frazier | 137/541 |
| 1,695,722 | 12/1928 | Smith | 137/541 |
| 1,994,770 | 3/1935 | King | 137/541 |
| 2,181,758 | 11/1939 | Goon et al. | 251/149.6 |
| 2,255,203 | 9/1941 | Wiegand | 137/541 X |
| 3,335,751 | 8/1967 | Davis, Jr. | 137/541 |
| 3,477,459 | 11/1969 | Schosson | 137/351 |
| 3,592,439 | 7/1971 | Ritchie, Jr. | 251/149.4 X |
| 3,756,273 | 9/1973 | Hengesbach | 137/541 X |
| 3,825,222 | 7/1974 | Petrova | 251/149.6 |

*Primary Examiner*—William R. Cline
*Attorney, Agent, or Firm*—Thomas H. Murray; Clifford A. Poff

[57] ABSTRACT

A valve device for draining liquids from a tank and, more particularly, a valve device for draining lubricating oil from an engine crankcase. The valve of the invention is characterized in having a generally tubular valve casing, containing a valve element spring-biased into closed position, which is permanently threaded into an opening in a tank. To open the valve and drain the contents of the tank, a pressing sleeve is inserted into the valve casing, this pressing sleeve serving to engage the valve element and unseat it as the sleeve advances into the casing by turning a cap nut which threads onto the casing, whereupon liquid will flow through the now-open valve and the pressing sleeve to a sump or the like.

3 Claims, 4 Drawing Figures

VALVE DEVICE FOR DRAINING LIQUIDS

BACKGROUND OF THE INVENTION

As is known, it is not the normal practice to provide a drain valve for the periodic draining of liquids from a tank such as an engine crankcase. Instead, a drain opening is provided in the bottom of the crankcase oil pan and is normally closed by a drain plug threaded into the drain opening. When used lubricating oil in an engine crankcase is changed in a workshop, the usual practice is to use special trays or the like which are placed below the drain opening and into which the waste oil flows after the drain plug has been removed from the drain opening, with inevitable spillage and soiling of the hands of the individual removing the drain plug.

In recent years, more and more of vehicle users are tending to make their own lubricating oil changes; and since very few of them have access to an inspection pit or an elevatable rack, at least a portion of the waste oil inevitably misses the receiving tray and spills onto the floor. This conventional process of changing lubricating oil is not only unsatisfactory for the vehicle user himself because of the spillage of oil but also leads to serious environmental pollution due to the necessity for relatively frequent oil changes by vehicle owners.

SUMMARY OF THE INVENTION

In accordance with the present invention, a new and improved valve device is provided which replaces the conventional drain plug in the oil pan of an engine crankcase or other tank, and which can be opened without spillage by the simple expedient of threading a pressing sleeve into the open end of the valve device casing.

Specifically, the invention includes a valve casing comprising an externally-threaded tubular member which is received within a threaded drain opening. A valve seat is formed on the end of the tubular member which extends into the drain opening. A circular valve element engages the valve seat and is spring-biased into engagement therewith so as to normally close the valve. Preferably, the valve element is provided with an axially-extending stem provided with a transverse, perforated disc at its lower end. A coil spring is interposed between the disc and a shoulder formed in the tubular valve casing to urge the valve element into seating engagement with the valve seat. A tubular pressing sleeve is insertable into the end of the tubular valve casing opposite the valve seat and can be connected by a cap nut to the valve casing, the inner end of the pressing sleeve engaging the aforesaid disc at the lower end of the valve stem to maintain the valve element disengaged from the valve seat when the cap nut is threaded onto the casing. Oil or other liquid can now simply flow past the valve seat and through the tubular sleeve into a receptacle.

To drain off liquid, the pressing sleeve is simply inserted into the lower end of the valve casing and threaded thereon by means of the cap nut. The cap nut can be tightened to move the valve element into the open position either completely or gradually, meaning that the outflow of the liquid can be controlled by turning the cap screw in one direction or the other.

Advantageously, a length of flexible hose can be secured to the outer periphery of the lower end of the pressing sleeve to convey the waste liquid directly to a special receptacle or the like. As will be appreciated, the valve device of the invention offers considerable advantages in draining oil from engine crankcases since it not only facilitates workshop drainage waste oil but also enables the ordinary vehicle user to drain his engine oil without dirtying himself in any way.

The above and other objects and features of the invention will become apparent from the following detailed description taken in connection with the accompanying drawings which form a part of this specification, and in which.

Figure 1:
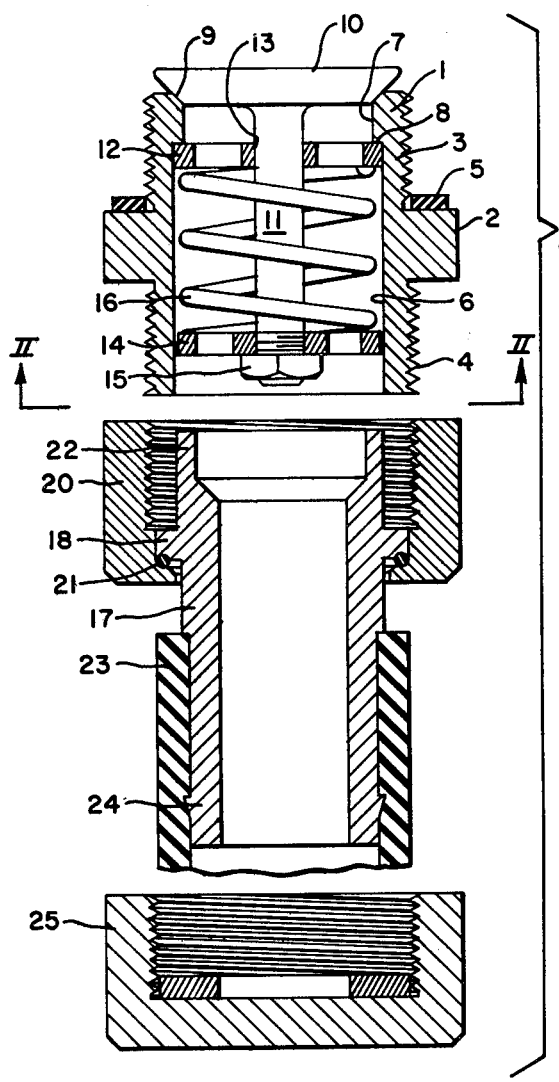
FIG. 1 is a longitudinal, exploded section through the valve casing, pressing sleeve and screw cap of one embodiment of the invention.
Figure 2:
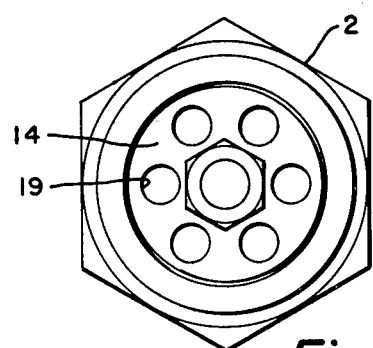
FIG. 2 is an end view of the valve casing of FIG. 1, taken substantially along line II—II of FIG. 1.

With reference now to the drawings, and particularly to FIG. 1, there is shown a generally tubular valve casing 1 having an external annular collar 2 with a generated surface in the form of a hexagon screw head (FIG. 2). On the outer periphery of the casing 1 on both sides of the collar 12 are threads 3 and 4. A ring gasket 5 made of an appropriate oil-resistant material is positioned on the screw-in side of the coller 2 so as to abut the periphery of a threaded drain hole in a tank or oil pan and seal the same.

Within the casing 1 is an inner bore or passage 6 which merges into a reduced diameter portion 7 by way of an annular shoulder or step 8 disposed in a plane extending perpendicular to the axis of the casing 1. At the front end face of the reduced diameter portion 7 is a conical seating surface 9.

At the upper end of the casing 1 is a circular valve element 10 having a beveled seating surface adapted to engage the valve seat 9. The valve element 10 can move upwardly away from the valve seat 9 and is provided with an axially-extending valve stem 11. Surrounding the valve stem 11 are two discs or mountings 12 and 14. Disc 12 is provided with a central bore 13 in which the stem 11 can slide; while the disc 14 is secured to the lower end of the stem 11 by means of a nut threaded onto a reduced diameter portion of the stem 11 such that the disc 14 is secured to the stem 11 between a shoulder formed in the stem and the nut 15.

The two discs 12 and 14 are provided with a number of apertures through which liquid can flow, the apertures in disc 14 being identified by the reference numeral 19 in FIG. 2. However, it should be understood that instead of the guide discs 12 and 14, elements of some other shape can be used to mount and guide the valve stem 11. For example, the guide elements can take the form of spiders having an inner ring abutting the stem 11 and arms extending radially outwardly to the inside diameter of the inner bore 6. Disposed between the discs 12 and 14 in FIG. 1 is a helical compression spring 16 which is in biasing engagement with the two discs 12 and 14 to maintain the valve element in sealing engagement with the valve seat 9.

It will be appreciated, of course, that when the valve casing 1 is threaded into a drain opening provided in the oil pan of an internal combustion engine, for example, the spring 16 will maintain the valve closed so that liquid cannot escape.

In order to open the valve and permit liquid to drain from the tank into which the valve casing 1 is threaded, a pressing sleeve 17 is provided. As shown in FIG. 1, the sleeve 17 has an external annular collar 18 which is engaged by a radially-inwardly extending flange on an internally threaded cap nut 20. An O-ring 21 is preferably provided between the flange on the cap nut 20 and the annular collar 18. The insertion end 22 of the sleeve 17 is adapted to slide into the bore 6 as shown. The lower end of the sleeve 17 extends far enough beyond the cap nut 20 to receive a required length of hose 23. Preferably, so that the hose 23 does not slip off the sleeve 17 accidentally, the extended end of the sleeve 17 has a peripheral protrusion 24.

As will be appreciated, the valve casing 1 remains within the drain opening instead of an ordinary drain plug. To keep dirt out of the valve casing, a screw cap 25 can be threaded onto the valve casing over the threads 4 when the pressing sleeve 17 is not in use. To drain the liquid, the cap 25 is first removed. Thereafter, the cap nut 20 carrying the pressing sleeve 17 is threaded onto the threads 4, whereupon the insertion end 22 moves upwardly to engage the disc 14. In doing so, it moves the stem 11 and valve element 10 upwardly to unseat the valve element against the force of spring 16. The open flow cross section and, consequently, the rate of outflow, can be controlled by turning the cap nut 20 in one direction or the other on the threads 4.

Figure 3:
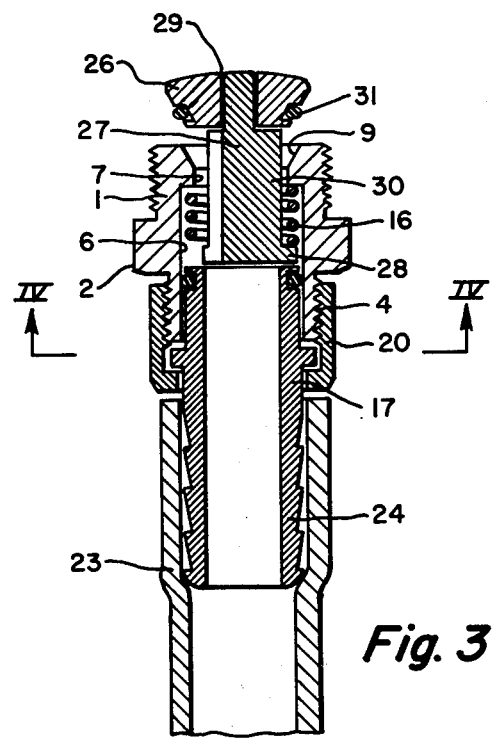
FIG. 3 is a longitudinal section through an alternative embodiment of the invention.
Figure 4:
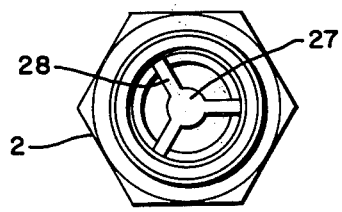
FIG. 4 is an end view of the valve casing of FIG. 3, taken substantially along line IV—IV of FIG. 3.

In the embodiment of the invention shown in FIGS. 3 and 4, elements corresponding to those of FIG. 1 are identified by like reference numerals. In this case, however, the valve element 26 is in threaded engagement with a stem instead of being integral therewith as in FIG. 1. As shown, the stem 27 and rear guide element 28 are integral. At its upper end, the stem 27 is provided with a reduced diameter threaded portion 29 which receives the valve element 26. The guide element 28, as best shown in FIG. 4, is provided with three arms which extend radially outwardly and into sliding engagement with the inner periphery of the bore 6. Between the guiding element 28 and the valve element 26 are radially-projecting arms 30 whose radial extent is less than the radial extent of the arms of element 28. The arms 30, which are axial extensions of the arms of the guide element 28, can move within the reduced diameter bore 7 beneath the valve seat 9. A ring gasket 31 formed of a material able to withstand oil and heat, is provided in an annular slot in the valve element 26 and is adapted to engage the valve seat 9 in closed position. The remainder of the assembly is essentially the same as that shown in FIG. 1. In order to prevent disengagement of the valve element from the threaded portion 29, the upper end of the threaded member 29 can be peened by a few light taps with a hammer after the elements 26 and 27 have threaded together.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A valve for draining liquids from an enclosure having a threaded opening, said valve comprising a tubular valve casing having an externally-threaded end portion adapted to be threaded into said threaded opening in said enclosure, said tubular valve casing having a conical valve seat at one internal end thereof, a valve element having a beveled seating surface engageable with said valve seat to prevent the flow of fluid through said valve casing, said valve element including an axially-extending solid valve stem, a first guide disc having fluid conducting apertures outwardly of a central bore receiving said solid valve stem, said valve casing further having a shoulder formed on the inner periphery thereof to support said first guide disc against movement toward said valve seat, a second guide disc having fluid conducting apertures outwardly of a central opening, said valve stem having a reduced diameter end portion forming an annular shoulder at the end of said solid valve stem opposite said valve element to support said second guide disc by the central opening thereof, fastening means engaging said reduced diameter end portion of the valve stem to secure said second guide disc thereto, a compression spring interposed between said first and second guide discs and within said valve casing to urge said valve element into engagement with said conical valve seat, a pressing sleeve insertable into the end of said valve casing which is opposite to the end having said valve seat, and cap nut means surrounding said pressing sleeve and operatively connected thereto, said valve casing and said cap nut means having threaded portions for feeding movement of the pressing sleeve into engagement with the second guide disc to unseat the valve element and permit liquid to flow through said valve casing and around said compression spring and through said pressing sleeve.

2. The valve of claim 1 characterized in that the tubular valve casting is provided with an external annular collar which engages the edge of the opening in said enclosure into which it is threaded.

3. The valve of claim 1 wherein said pressing sleeve is provided with an external annular collar engaged by said cap nut means.

* * * * *